United States Patent
Chen et al.

(10) Patent No.: US 7,330,459 B2
(45) Date of Patent: Feb. 12, 2008

(54) MAC CONTROLLER AND CLOCK SYNCHRONIZING METHOD FOR USE WITH THE SAME

(75) Inventors: Lyndon Chen, Shindian (TW); Celine Kang, Shindian (TW)

(73) Assignee: Via Technologies, Taipei (TW)

( * ) Notice: Subject to any disclaimer, the term of this patent is extended or adjusted under 35 U.S.C. 154(b) by 869 days.

(21) Appl. No.: 10/671,277

(22) Filed: Sep. 25, 2003

(65) Prior Publication Data
US 2004/0076186 A1    Apr. 22, 2004

(30) Foreign Application Priority Data
Oct. 22, 2002    (TW) .............................. 91124410 A

(51) Int. Cl.
*H04J 3/06*    (2006.01)
(52) U.S. Cl. ...................................... 370/350; 370/503
(58) Field of Classification Search ................ 370/350, 370/503; 375/354, 358, 359
See application file for complete search history.

(56) References Cited

U.S. PATENT DOCUMENTS

| | | | |
|---|---|---|---|
| 5,553,076 A * | 9/1996 | Behtash et al. ............. | 370/311 |
| 6,993,009 B2 * | 1/2006 | Kelly et al. ................. | 370/350 |
| 2001/0022823 A1 * | 9/2001 | Renaud ...................... | 375/359 |
| 2002/0176446 A1 * | 11/2002 | Rasanen ..................... | 370/503 |
| 2004/0010729 A1 * | 1/2004 | Lockridge et al. .......... | 713/500 |

* cited by examiner

*Primary Examiner*—Ricky Q. Ngo
*Assistant Examiner*—Pao Sinkantarakorn
(74) *Attorney, Agent, or Firm*—Volpe and Koenig, PC

(57) ABSTRACT

In a wireless local area network media access controller (MAC) disposed in a first node of a wireless local area network, a method is performed to synchronize the clock of the first node with the clock of a second node in the wireless local area network. When a request signal is asserted from the first node to the second node, a responsive signal packet containing a time stamp is asserted from the second node to the first node in response to the request signal. Then, the MAC tags a local time value to the responsive signal packet at the first node, and operates the time stamp and the local time value according to a control program to obtain a difference T, which is stored in a register of the MAC. Afterwards, at least one of the clocks of the first and the second nodes is adjusted to synchronize the clocks of the first and the second nodes according to the difference T.

15 Claims, 4 Drawing Sheets

MAC CONTROLLER AND CLOCK SYNCHRONIZING METHOD FOR USE WITH THE SAME

FIELD OF THE INVENTION

The present invention relates to a media access controller (MAC), and more particularly to a media access controller of a node implementing clock synchronization with another node. The present invention also relates to a method for synchronizing clock between two nodes.

BACKGROUND OF THE INVENTION

In modern society, networks facilitate the rapid transference and exchange of a great amount of data, information, multimedia and knowledge in a digital and electronic form. This promotes interpersonal communication, accumulation of experience, knowledge exchange, and technological advancement. Thus, networks have already become a foundation of the modern information-age society. Wired networks already having had a broad, almost universal, foundation, wireless networks nowadays are also being developed rapidly, allowing users to access information sources at any time, in any place, in a mobile and portable way.

Please refer to FIG. 1, which is a functional block diagram of a computer system 10 of the prior art, capable of accessing wireless networks. The computer system 10 is designed with a central processing unit CPU0, a Northbridge chip NB0, a Southbridge chip SB0, memory 12, a graphics accelerator card 16, a display 18, a peripheral device P0, and a storage device M0. In order to access a wireless network 22, the computer 10 can be designed with a wireless network card 20. The central processing unit CPU0 is used to control operation of the computer 10; the Northbridge chip NB0 electrically connects the central processing unit CPU0, the memory 12, and the graphics accelerator card 16, and is used to manage a rapid information exchange between the three. The memory 12 is used to store, in a volatile fashion, information and programs needed while the central processing unit CPU0 is operating. The central processing unit CPU0 uses the graphics card 16 to process image data, and to send the image to the display 18, which then displays the image. The Southbridge chip SB0 connects the Northbridge chip to a plurality of buses 24 (such as PCI, IDE, or USB). The peripheral device P0 (such as a sound card), the non-volatile storage device M0 (such as a CDROM drive or a hard disk drive) and the wireless network card 20 are on the buses. The Southbridge chip SB0 primarily manages lower-speed information transfer between the central processing unit CPU0 and the devices connected to the buses.

The wireless network card 20 could be a network card that complies with the IEEE 802.11 wireless local area network (WLAN) specification. The wireless network card 20 is designed with a media access circuit MAC and a physical layer circuit PHY. Under the open system interconnection (OSI) architecture, the media access circuit MAC is used to implement media access control layers for the wireless networks. When the computer 10 is used to access network resources, the media access circuit MAC can use the corresponding physical layer circuit PHY1 to acquire digital information, process the information, and send the information to the computer. Information that the computer 10 sends to the network is packaged by the media access circuit MAC. The media access circuit MAC also arranges a physical location for the packaged information to access the network, and sends the packaged information to the physical layer circuit PHY. Similarly, the media access circuit MAC unpacks information received by the physical layer circuit PHY from the network.

The physical layer circuit PHY of the wireless network card 20 is used for providing wireless physical layer functionality. Information to be sent to the network, after being processed by the media access circuit MAC, is sent to the corresponding physical layer circuit PHY, which converts the information to a signal suitable for transmission, and transmits the signal. The physical layer circuit PHY can also receive signals from the network and unpack or demodulate the signals to acquire information contained in the signals, then send the information to the corresponding media access circuit MAC. The physical layer circuit PHY used for wireless network access further comprises a baseband circuit and a radio frequency (RF) circuit (not shown). The baseband circuit performs digital processing on information received from the media access circuit MAC, and then the RF circuit wirelessly transmits the information. RF wireless frequency signals received from the wireless network are received by the RF circuit. Then, the baseband circuit converts the demodulated signal into electronic information that is further sent to the media access circuit MAC.

When the computer 10 accesses network resources, all network cards work with a driver program stored in the memory 12. The driver program manages data transfer between the computer 10 and the network. A wireless network driver 26 is used with the wireless network card 20 to allocate a plurality of descriptors TxB (indicated individually as TxB(1) through TxB(n2)) and a plurality of descriptors RxB (indicated individually as RxB(1) through RxB(m2)) for pointing to a data transmission allocation DTB and a data reception allocation DRB. Information to be sent to the wireless network 22 is stored in the memory allocation DTB pointed to by the descriptors TxB, and information received from the wireless network 22 is stored in the memory allocation DRB pointed to by the descriptors RxB. For the computer 10 to access the wireless network, the media access circuit MAC and the central processing unit CPU0 use the descriptors TxB and RxB to access the information sent to the wireless network, and received from the wireless network, stored in the memory 12.

To accommodate special demands of the wireless network, the descriptors TxB and RxB used for accessing the wireless network must further indicate a particular status of the wireless network. For example, because the wireless network 22 and the computer 10 are not connected by a physical network cable, when the computer 10 transmits a large amount of wireless information to the wireless network 22, the computer 10 has no way of confirming that the information sent wirelessly by the wireless network card 20 has already been received smoothly by another computer on the wireless network 22. At this time, the central processing unit CPU0 requests that the wireless network 22 send to the computer 10 an acknowledgement of data having been received completely. In practice, when the central processing unit CPU0 uses the wireless network driver 26 to store the information to the memory allocation DTB, the central processing unit CPU0 arranges the descriptor TxB to point to the memory allocation DTB, and the descriptor TxB indicates the acknowledgement required by the wireless network 22. When the media access circuit MAC of the wireless network card 20 accesses the information according to the descriptor TxB, the media access circuit MAC uses the descriptor TxB to know to request acknowledgement from the wireless network 22. In this way, when the media access circuit MAC packages the information, the media access circuit MAC adds acknowledgement information to the head of the packet. The packet is then sent to the physical layer PHY, and the physical layer PHY sends the packet wirelessly to the wireless network 22.

Practically speaking, in an architecture such as IEEE 802.11, aside from the acknowledgement request, there are a number of settings that are different from those of the wired network. For example, as information is transmitted wirelessly, in addition to the transmitter and the receiver, any third party that can receive wireless signals could intercept the wirelessly transmitted information. In order to ensure that the information content does not leak, the IEEE 802.11 architecture provides a wired-equivalent privacy (WEP) mode, which encrypts transmitted and received information at both ends, and maintains basic information security. The central processing unit CPU0 also uses the descriptors TxB and RxB to govern whether or not the media access circuit MAC uses WEP to access network resources. Also, in order to adapt to a portable nature of computers employing the wireless network architecture, in the wireless network architecture, each computer connects to the network at an access point. More specifically, when the computer 10 accesses information on the wireless network 22, the computer 10 establishes contact to get a basic service set (BSS) organized by an access point. The basic service set can comprise a plurality of computers, all connected wirelessly to the BSS through connection to the access point. A physical wireless network address of the access station could act as a basic service set identification (BSSID). When a first computer in a first basic service set connects to a second computer of a second BSS, the first computer first contacts an access point of the first BSS. The access point of the first BSS connects to an access point of the second BSS through a distribution system service (DSS), and then connects to the second computer through the second access point, allowing the first computer to contact the second computer. In the wireless connection process just described, each computer must make contact with a respective access point, enter/exit the BSS, access the DSS through the access point, etc. And all of these matters occur between the computers and the access points with the help of management and control framework information, such as BSSID's, acknowledgements, and beacons.

For coordinating the work of the devices in the wireless transmission network as mentioned above, clock synchronization between the station and the access point is a quite important issue.

SUMMARY OF THE INVENTION

Therefore, an object of the present invention is to provide a method for synchronizing clocks of the station and the access point.

Another object of the present invention is to provide a media access controller (MAC) utilizing a clock synchronizing method to assure of good wireless transmission.

A first aspect of the present invention relates to a method for synchronizing clocks of a first and a second nodes in a wireless local area network. The method comprises steps of: asserting a request signal from the first node to the second node; asserting a responsive signal packet containing a time stamp in response to the request signal from the second node to the first node; tagging a local time value to the responsive signal packet at the first node; operating the time stamp and the local time value at the first node according to a control program to obtain a difference T; and adjusting at least one of the clocks of the first and the second nodes to synchronize the clocks of the first and the second nodes according to the difference T.

Preferably, it is the clock of the station to be adjusted to synchronize with the clock of the access point according to the difference T.

In one embodiment, the first and the second nodes are a station and an access point, respectively, and the clock of the station is adjusted to synchronize with the clock of the access point according to the difference T.

For example, the request signal is a probe-request signal asserted by the station, and the responsive signal packet is a probe-response signal packet asserted by the access point.

Preferably, the time stamp is a counting value C1 of a remote counter in the access point, which is generated when the responsive signal packet is asserted by the access point, and the local time value is a counting value C2 of a local counter in the station, which is generated when the responsive signal packet is received by the station. In this case, the difference T is equal to C1-C2, and stored in a difference register in the station.

In one embodiment, the clock of the station is adjusted by adding the difference T to a new counting value of the local counter.

Preferably, the method further comprises a step of determining switching timing between a working and a sleeping modes of the station after the clocks of the station and the access point are synchronized. The step comprises sub-steps of obtaining next target beacon transmission time by operating a beacon interval and the new counting value adjusted with the difference T; and determining the switching timing between the working and the sleeping modes of the station according to the new counting value, the difference T and the next target beacon transmission time.

In another embodiment, the method is for use between a first and a second stations, which serve as the first and the second nodes, respectively.

A second aspect of the present invention relates to a wireless local area network media access controller disposed in a first node of a wireless local area network. The wireless local area network media access controller comprises a local time tagger tagging a local time value to a responsive signal packet received from a second node of the wireless local area network in response to a request signal asserted by the first node to the second node; and a difference register storing therein a difference T between the local time value and a time stamp, the difference T being referred to adjust at least one of clocks of the first and the second nodes to synchronize the clocks of the first and the second nodes.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
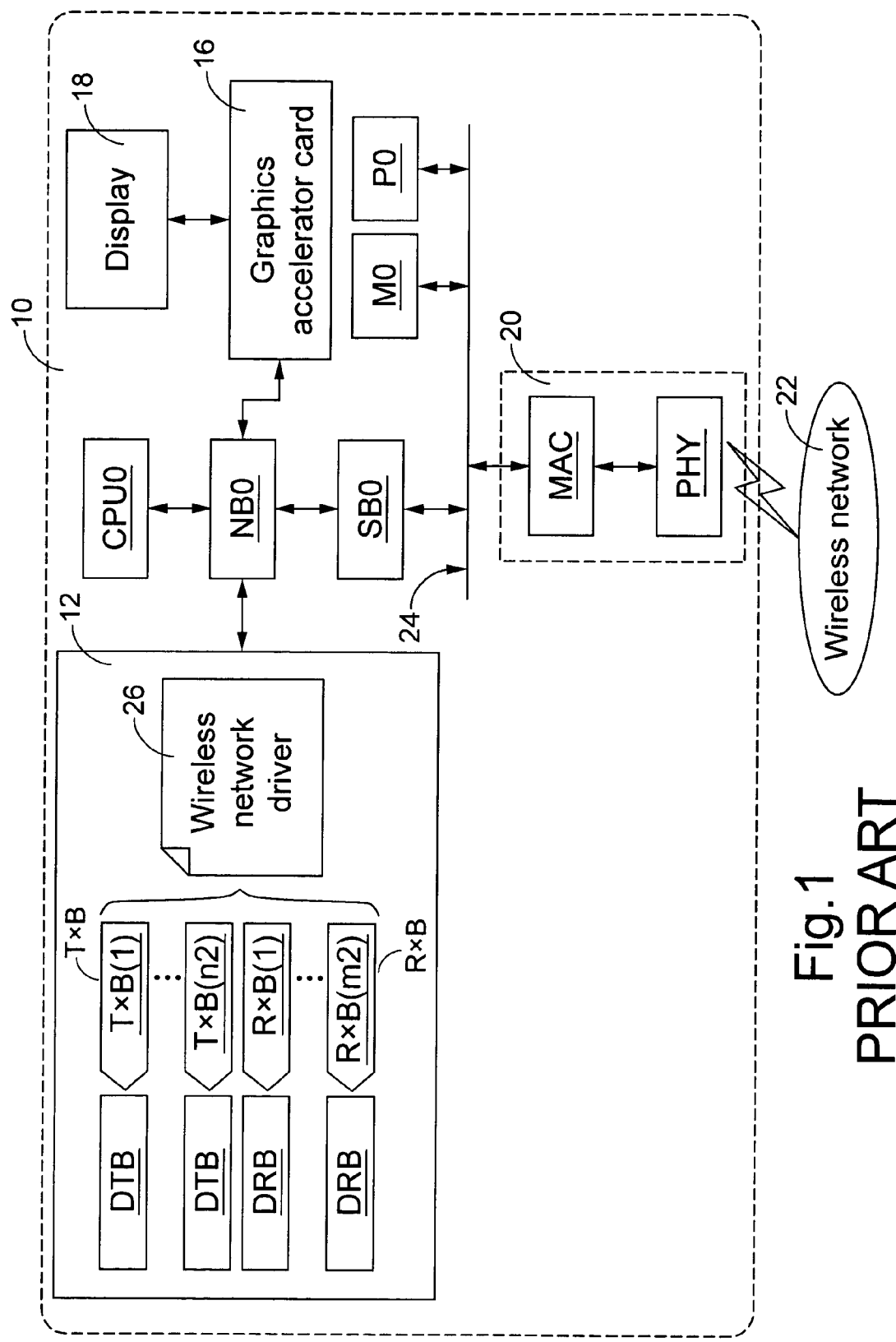
FIG. 1 is a functional block diagram schematically showing a prior-art computer system capable of accessing wireless networks.
Figure 2:
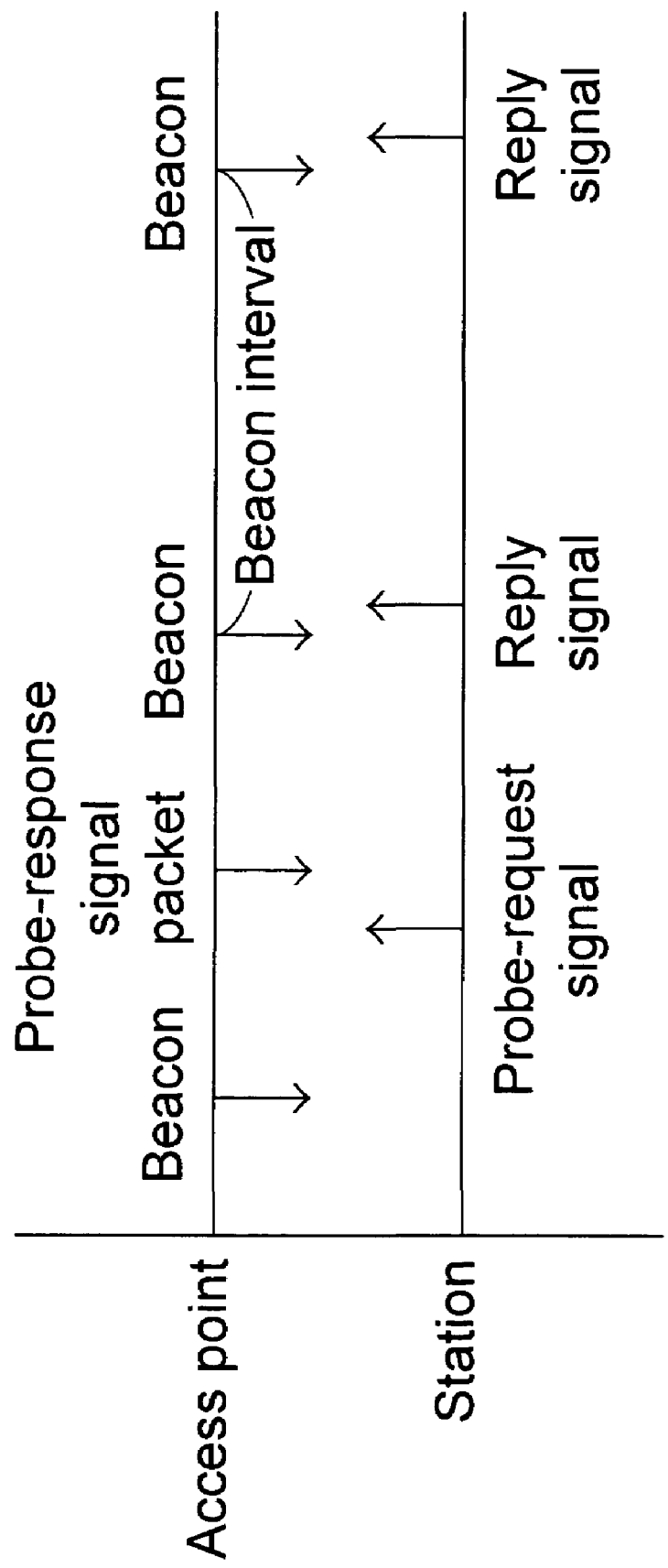
FIG. 2 is a schematic time-sequence diagram showing the corresponding signals asserted by a station and an access point in a wireless local area network.

Please refer to FIG. 2, in which the corresponding signals asserted by a station and an access point in an IEEE 802.11 wireless local area network (WLAN) are schematically shown. When a station is to take part in a basic service set (BSS) organized by an access point in a wireless communication manner, the station asserts a probe-request signal at first. In response to the probe-request signal, the access point will assert a probe-response signal packet having a format as shown in FIG. 3A.

Figure 3B:
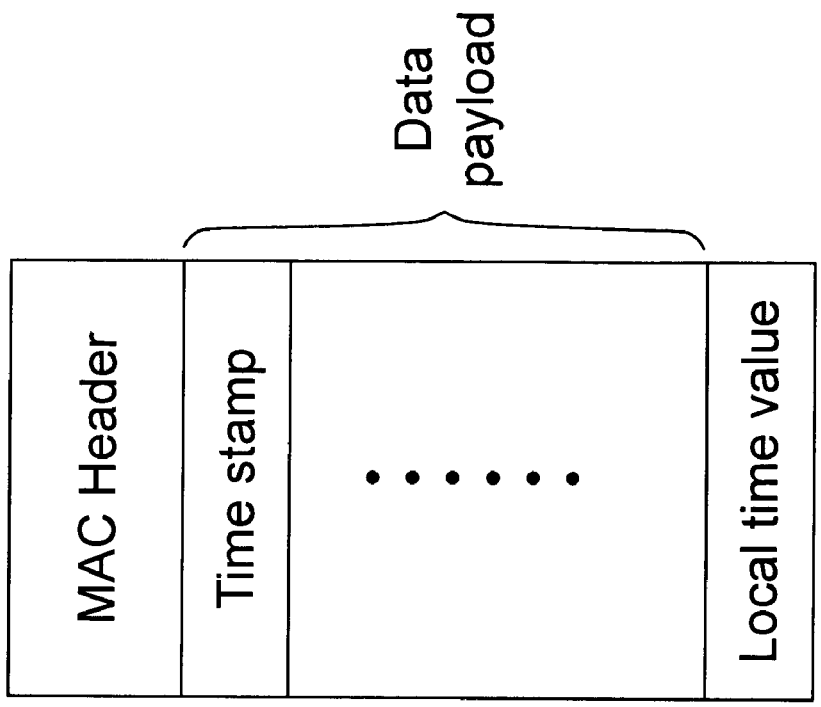
FIGS. 3A and 3B are schematic diagrams showing formats of the probe-response signal packet of FIG. 2, which are expressed when the probe-response signal packet is asserted by the access point and received by the station, respectively.
Figure 3A:
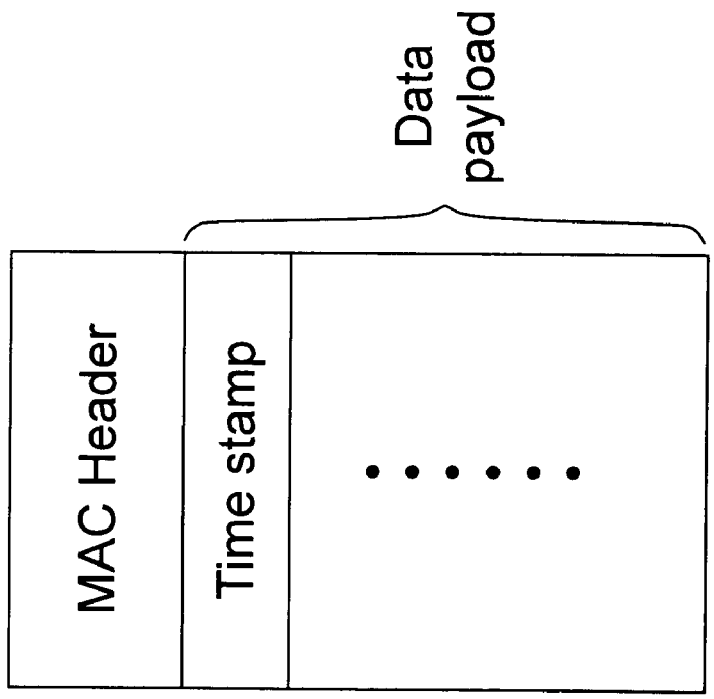

Please refer to FIG. 3A. The probe-response signal packet includes a media access controller (MAC) header and a data payload region. The data payload region contains time stamp information. The time stamp is a counting value C1 of a remote counter in the access point, and generated when the responsive signal packet is asserted by the access point. Generally, the remote counter is a 64-bit counter.

After the probe-response signal packet has been received by the physical layer circuit PHY of the networking device of the station, it is uploaded to the media access controller (MAC) to be processed. By the MAC hardware, a local time value is tagged to the probe-response signal packet, as shown in the format of FIG. 3B, and then further uploaded. The local time value is a counting value C2 of a local counter in the station, which is generated when the probe-response signal packet is received by the station. Generally, the local counter is a 64-bit counter.

Figure 4:
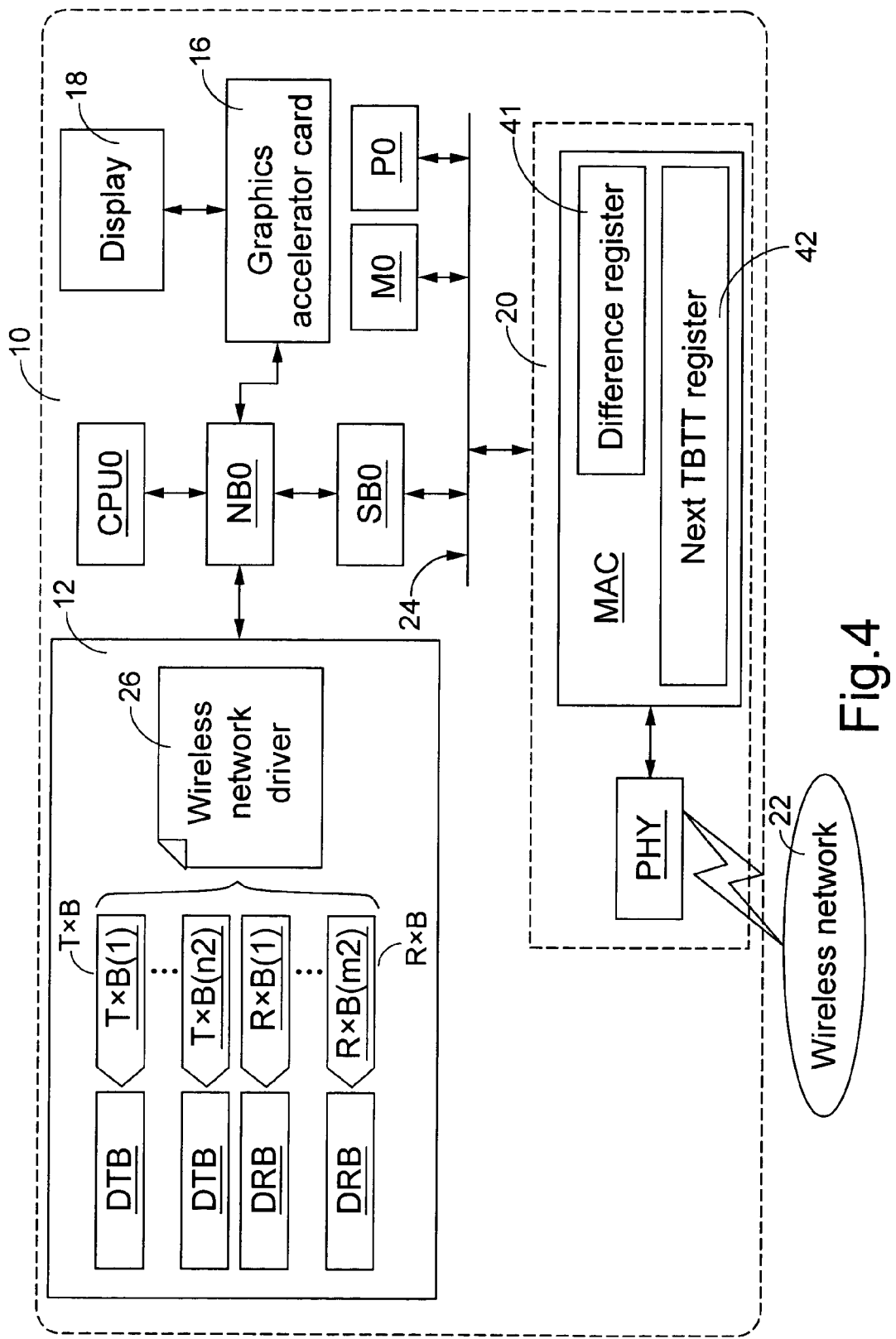
FIG. 4 is a functional block diagram schematically showing a computer system capable of accessing wireless networks by a wireless local area network media access controller according to the present invention.

The time stamp C1 and the local time value C2 is then operated by a control program of the station, e.g. the driver program of a wireless network interface card, to obtain a difference T=C1−C2. The difference T is stored in a difference register 41 of the station (FIG. 4). Accordingly, the local counting value can be made consistent with the remote counting value by adjusting the new local counting value with the difference T, thereby synchronizing the clock of the station with the access point. The present invention delicately utilizes hardware and software means to accomplish the clock synchronization between the station and the access point.

Refer to FIG. 2 again. In an IEEE 802.11 infrastructure mode, beacons are asserted at intervals by the access point. In response to the beacons, corresponding reply signals are asserted by the station to notice the access point of the connection status of the station. Accordingly, a term "target beacon transmission time (TBTT)" is defined in the wireless transmission protocol, and complies with the equation, mod (TBTT, Beacon interval)=0, where mod(m, n) is the remainder on division of m by n.

When the station enables a function of predicting next TBTT, the next TBTT is evaluated by the control program of the station, e.g. the driver program of a wireless network interface card, according to the following formula:

Next $TBTT=[int(C/\text{Beacon Interval})+1]*(\text{Beacon Interval})$, where C is the counting value having been adjusted with the difference T, and int(x) is a rounding function of x, i.e. a function giving the integer part of x. The next TBTT is stored in a next TBTT register 42.

From the above description, it is understood that when the access point will assert next beacon can be predicted by operating the new counting value, the difference between the counting values of the access point and the station, i.e. the time stamp and the local time value, and the next TBTT stored in the register 42. Accordingly, even when the station is in the sleeping mode, the station can be timely awakened to enter the working mode to reply to the beacon just before the access point asserts next beacon, and then enters the sleeping mode again to save power. The switching timing between the working and the sleeping modes of the station can be well coordinated as long as the function of predicting next TBTT is kept enabled.

The present method and device can also be applied to a system, for example, in an independent basic service set (IBSS) ad-hoc mode without any access point. The principles and operations for synchronizing clocks of two stations are similar to those mentioned above for synchronizing clocks of a station and an access point.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for synchronizing clocks of a station and an access point in a wireless local area network, comprising steps of:

asserting a request signal from a station to an access point;

asserting a responsive signal packet containing a time stamp in response to said request signal from said access point to said station;

tagging a local time value to said responsive signal packet at said station;

operating said time stamp and said local time value at said station according to a control program to obtain a difference T; and determining switching timing between a working and a sleeping modes of said station after said clocks of said station and said access point are synchronized, which comprises sub-steps of:

obtaining next target beacon transmission time by operating a beacon interval and said adjusted local time value; and determining said switching timing between said working and said sleeping modes of said station according to said local time value, said difference T and said next target beacon transmission time.

2. The method according to claim 1 wherein said request signal is a probe-request signal asserted by said station.

3. The method according to claim 1 wherein said responsive signal packet is a probe-response signal packet asserted by said access point.

4. The method according to claim 1 wherein said time stamp is a counting value C1 of a remote counter in said access point, which is generated when said responsive signal packet is asserted by said access point.

5. The method according to claim 4 wherein said local time value is a counting value C2 of a local counter in said station, which is generated when said responsive signal packet is received by said station.

6. The method according to claim 5 wherein said difference T is equal to C1-C2, and stored in a difference register in said station.

7. The method according to claim 6 wherein said clock of said station is synchronized with said clock of said access point by adding said difference T to a new counting value of said local counter.

8. A wireless local area network media access controller, disposed in a first node of a wireless local area network, comprising:
a local time tagger tagging a local time value to a responsive signal packet received from a second node of said wireless local area network in response to a request signal asserted by said first node to said second node; and
a difference register storing therein a difference T between said local time value and a time stamp, said difference T being referred to adjust at least one of clocks of said first and said second nodes to synchronize said clocks of said first and said second nodes;
a register for storing a next target beacon transmission time, a next target beacon transmission time being obtained by operating a beacon interval and said local time value adjusted with said difference T, and referred to determine switching timing between a working and a sleeping modes of said first node along with said local time value and said difference T.

9. The wireless local area network media access controller according to claim 8 wherein said first and said second nodes are a first and a second station, respectively.

10. The wireless local area network media access controller according to claim 8 wherein said first and second nodes are a station and an access point, respectively.

11. The wireless local area network media access controller according to claim 10 wherein said clock of said station is adjusted to synchronize with said clock of said access point according to said difference T.

12. The wireless local area network media access controller according to claim 11 wherein said request signal is a probe-request signal asserted by said station, and wherein said responsive signal packet is a probe-response signal packet asserted by said access point.

13. The wireless local area network media access controller according to claim 12 wherein said time stamp is a counting value C1 of a remote counter in said access point, which is generated when said responsive signal packet is asserted by said access point.

14. The wireless local area network media access controller according to claim 13 wherein said local time value is a counting value C2 of a local counter in said station, which is generated when said responsive signal packet is received by said station.

15. The wireless local area network media access controller according to claim 14 wherein said clock of said station is adjusted by adding said difference T to a new counting value of said local counter.

* * * * *